United States Patent
Yoshinaga

(10) Patent No.: US 9,735,694 B2
(45) Date of Patent: Aug. 15, 2017

(54) INTEGRATED CIRCUIT AND SWITCHING POWER-SUPPLY DEVICE WITH CHARGING CONTROL CIRCUIT

(71) Applicant: Sanken Electric Co., LTD., Niiza-shi, Saitama (JP)

(72) Inventor: Mitsutomo Yoshinaga, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 159 days.

(21) Appl. No.: 14/744,579

(22) Filed: Jun. 19, 2015

(65) Prior Publication Data

US 2016/0373010 A1    Dec. 22, 2016

(51) Int. Cl.
   *H02M 3/335*    (2006.01)

(52) U.S. Cl.
   CPC ..... *H02M 3/33592* (2013.01); *Y02B 70/1475* (2013.01)

(58) Field of Classification Search
   CPC ............... H02M 3/24; H02M 3/33592; H02M 3/33576; Y02B 70/1475
   USPC ................................................. 363/15, 21.14
   See application file for complete search history.

(56) References Cited

U.S. PATENT DOCUMENTS

| | | | | |
|---|---|---|---|---|
| 6,462,965 B1* | 10/2002 | Uesono | ............. | H02M 3/33592 363/21.14 |
| 9,030,848 B2* | 5/2015 | Sato | .................. | H02M 3/33592 363/21.06 |
| 2009/0161396 A1* | 6/2009 | Lin | .................... | H02M 3/33592 363/125 |
| 2014/0097808 A1* | 4/2014 | Clark | ........................ | G05F 1/70 323/208 |
| 2014/0268915 A1* | 9/2014 | Kong | ................ | H02M 3/33592 363/21.14 |
| 2016/0111961 A1* | 4/2016 | Balakrishnan | .... | H02M 3/33507 363/21.12 |

* cited by examiner

*Primary Examiner* — Jue Zhang
*Assistant Examiner* — Jye-June Lee
(74) *Attorney, Agent, or Firm* — Banner & Witcoff, Ltd.

(57) ABSTRACT

A switching power-supply device has a smoothing capacitor connected between a ground-side output terminal connected to one end of a secondary winding of a transformer and a non-ground-side output terminal connected to the other end of the secondary winding; an N-type transistor connected between the non-ground-side output terminal and the other end of the secondary winding; a capacitor connected to a connection point of the N-type transistor and the other end of the secondary winding; a charging circuit connected between a connection point of the N-type transistor and the non-ground-side output terminal and the capacitor and configured to charge the capacitor, and a control circuit configured to perform on-and-off control of the N-type transistor by using a voltage of the capacitor.

3 Claims, 5 Drawing Sheets

INTEGRATED CIRCUIT AND SWITCHING POWER-SUPPLY DEVICE WITH CHARGING CONTROL CIRCUIT

TECHNICAL FIELD

The disclosure relates to a switching power-supply device configured to control an output voltage by a switching operation, and an integrated circuit used for the same.

BACKGROUND ART

A switching power-supply device configured to control an output voltage by a switching operation using a switching element such as a transistor has a switching element serially connected to an input power supply and a primary winding of a transformer, and a switching control circuit configured to perform on-and-off control of the switching element for switching operation, and is configured to rectify and smooth a secondary electromotive force generated at a secondary winding of the transformer and to output a direct current voltage.

A synchronous rectification method of using an N-type transistor, instead of a diode, as an element configured to rectify the secondary electromotive force, and turning on- and-off the transistor in synchronization with a predetermined clock for rectification has been known.

SUMMARY

When the synchronous rectification method is used in the switching power-supply device, a first configuration where an N-type transistor is provided between a ground-side terminal of the secondary winding of the transformer and a ground-side output terminal of a secondary circuit is considered. According to the first configuration, the ground-side terminal of the secondary winding of the transformer becomes a potential floating from a ground potential of the secondary circuit. Accordingly, it is difficult to take measures against EMI (Electro Magnetic Interference) such as conduction/emission noise.

Therefore, a second configuration is adopted in which the N-type transistor is provided between an opposite terminal to the ground-side terminal of the secondary winding of the transformer and a non-ground-side output terminal of the secondary circuit. According to the second configuration, since the ground-side terminal of the secondary winding of the transformer becomes a stable potential all the time, it is easy to take measures against the EMI.

However, according to the second configuration, it is necessary to add an auxiliary winding to the opposite terminal to the ground-side terminal of the secondary winding of the transformer and to drive a gate of the N-type transistor by using an induced electromotive force of the auxiliary winding.

In case that the auxiliary winding be added, the cost increases, as compared to the switching power-supply device of the related art, and also the configuration is not favorable from a standpoint of safety, too.

With considerations above, an object of the disclosure is to provide a switching power-supply device and an integrated circuit to be used for the switching power-supply device capable of performing rectification by a synchronous rectification method at a secondary-side circuit at low costs.

An integrated circuit of this disclosure is an integrated circuit to be used in a switching power-supply device having: a first switching element; a transformer including a primary winding connected to the first switching element and a secondary winding magnetically coupled to the primary winding; a first control circuit configured to perform on-and-off control of the first switching element; a smoothing capacitor connected between a ground-side output terminal connected to one end of the secondary winding and a non-ground-side output terminal connected to the other end of the secondary winding; an N-type transistor for rectification connected between the non-ground-side output terminal and the other end of the secondary winding, and a capacitor connected to a connection point of the N-type transistor and the other end of the secondary winding, the integrated circuit comprising: a charging circuit, which is connected between a connection point of the N-type transistor and the non-ground-side output terminal and the capacitor or between the capacitor and the ground-side output terminal and which charges the capacitor, and a second control circuit, which performs the on-and-off control of the N-type transistor by using a voltage of the capacitor as a power supply voltage.

A disclosed switching power-supply device has the integrated circuit, the first switching element, the transformer, the first control circuit, the smoothing capacitor, the capacitor, and the N-type transistor.

According to the disclosure, it is possible to provide the switching power-supply device capable of performing rectification by the synchronous rectification method at the secondary-side circuit at low costs.

DETAILED DESCRIPTION

Hereinafter, illustrative embodiments of the disclosure will be described with reference to the drawings.

Figure 1:
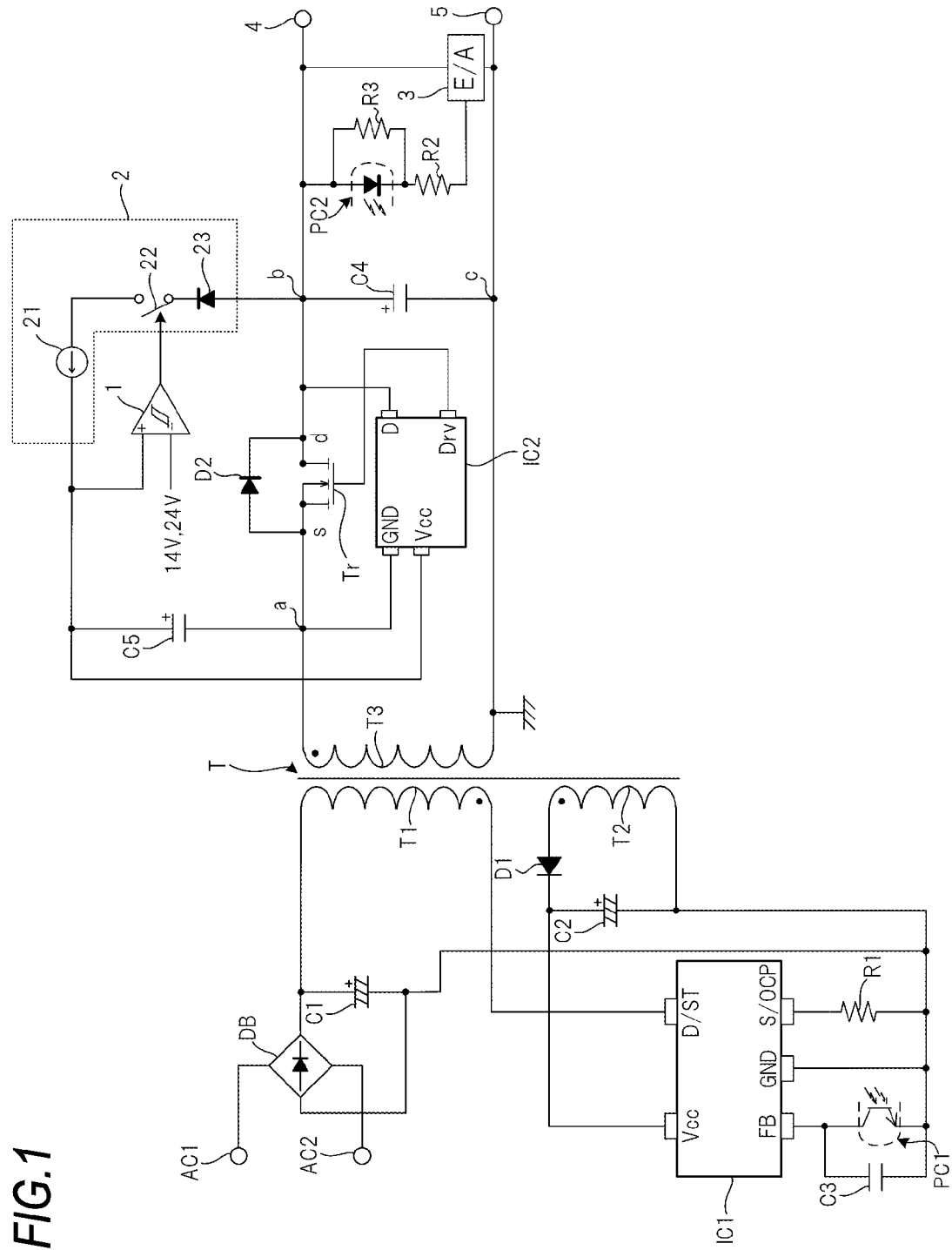
FIG. 1 is a circuit diagram showing an internal configuration of a switching power-supply device of an illustrative embodiment of the disclosure.

FIG. 1 is a circuit diagram showing an internal configuration of a switching power-supply device of an illustrative embodiment of the disclosure.

In FIG. 1, a primary-side circuit of the switching power-supply device has a rectification circuit DB, capacitors C1, C3, a primary winding T1 and an auxiliary winding T2 which are configuring a transformer T, a controller IC1 which is a first control circuit, a diode D1 and a capacitor C2 for generating a power supply voltage of the controller IC1, a current detection resistance R1, and a light receiving transistor PC1 configuring a photo-coupler.

In FIG. 1, a secondary-side circuit of the switching power-supply device has a secondary winding T3 configuring the transformer T, a controller IC2 which is a second control circuit, an N-type transistor Tr (MOSFET, in the example of FIG. 1) and a smoothing capacitor C4 configuring a rectification-and-smoothing circuit configured to rectify and smooth an output voltage of the secondary winding T3, a capacitor C5 configured to supply a power supply voltage to the controller IC2, a charging circuit 2 configured to charge the capacitor C5, a comparator 1 configuring a charging control circuit to control the charging circuit 2 on the basis of a voltage of the capacitor C5, a light emitting diode PC2 configuring the photo-coupler, resistances R2, R3, and an error amplifier (E/A) 3. The controller IC2, the charging circuit 2, and the comparator 1 configure an integrated circuit.

Two output terminals of the secondary-side circuit include a ground-side output terminal 5 connected to a ground, and a non-ground-side output terminal 4 not connected to the ground.

A commercial alternating current power supply is connected to alternating current input terminals AC1, AC2 of the rectification circuit DB in which a diode is bridged. An alternating current voltage input from the commercial alternating current power supply is full wave-rectified and is output from the rectification circuit DB.

The capacitor C1 is connected between a rectified output positive terminal and a rectified output negative terminal of the rectification circuit DB. Also, the rectified output negative terminal of the rectification circuit DB is connected to a ground terminal. Thereby, a direct current voltage is obtained by rectifying and smoothing an alternating current voltage supplied from the commercial alternating current power supply at the rectification circuit DB and the capacitor C1.

The controller IC1 has a first switching element such as a power MOSFET (Metal Oxide Semiconductor Field Effect Transistor) and a driving circuit configured to perform (switching control) on-and-off control of the first switching element, which are embedded in the controller IC1.

The controller IC1 has a D/ST (MOSFET drain/starting current input) terminal connected to a drain of the first switching element, an S/OCP (MOSFET source/overcurrent protection) terminal connected to a source of the first switching element, a VCC (IC power supply voltage input) terminal, an FB (feedback signal input) terminal, and a GND terminal.

The transformer T configured to feed power from the primary-side circuit to the secondary-side circuit is provided with the primary winding T1, the auxiliary winding T2 and the secondary winding T3 magnetically coupled to the primary winding T1.

The rectified output positive terminal of the rectification circuit DB is connected to one end of the primary winding T1 of the transformer T, and the other end of the primary winding T1 of the transformer T is connected to the D/ST terminal of the controller IC1. The S/OCP terminal of the controller IC1 is connected to the ground terminal via the current detection resistance R1.

The controller IC1 is configured to perform on-and-off control of the first switching element embedded therein, so that the power fed to the primary winding T1 of the transformer T is transferred to the secondary winding T3 of the transformer T, and thus current is generated at the secondary winding T3 of the transformer T. Also, the current detection resistance R1 is connected as a resistance configured to detect the current flowing through the first switching element embedded in the controller IC1, as a voltage signal $V_{ocp}$.

The controller IC1 has an overcurrent protection (OCP) function of limiting the power to be fed to the secondary-side circuit when the voltage signal $V_{ocp}$ corresponding to the current flowing through the first switching element is equal to or greater than a preset overcurrent threshold.

The capacitor C2 is connected between both terminals of the auxiliary winding T2 of the transformer T via the diode D1. A connection point of the diode D1 and the capacitor C2 is connected to the Vcc terminal of the controller IC1. Thereby, the voltage generated at the auxiliary winding T2 is rectified and smoothed by the diode D2 and the capacitor C3, and is then supplied to the Vcc terminal of the controller IC1, as a the power supply voltage Vcc for IC.

The one end (lower end in FIG. 1) of the secondary winding T3 of the transformer T is connected to the ground-side output terminal 5. The other end (upper end in FIG. 1) of the secondary winding T3 of the transformer T is connected to a source s of the N-type transistor Tr.

A drain d of the N-type transistor Tr is connected to the non-ground-side output terminal 4. A gate of the N-type transistor Tr is connected to a Dry terminal of the controller IC2. The source s of the N-type transistor Tr is connected to the GND terminal of the controller IC2.

The diode D2 connected in parallel with the N-type transistor Tr is a body diode of the N-type transistor Tr.

The smoothing capacitor C4 is connected between the ground-side output terminal 5 and the non-ground-side output terminal 4. A positive terminal of the smoothing capacitor C4 is connected to a connection point b of the N-type transistor Tr and the non-ground-side output terminal 4. A negative terminal of the smoothing capacitor C4 is connected to a connection point c of the one end of the secondary winding T3 and the ground-side output terminal 5.

A voltage that is induced to the secondary winding T3 of the transformer T is rectified and smoothed by the N-type transistor Tr and the smoothing capacitor C4, which are configured to perform rectification by a synchronous rectification method, and a voltage between the terminals of the smoothing capacitor C4 is output from the output terminal, as an output voltage Vo. In the meantime, a line connected to the positive terminal of the smoothing capacitor C4 is a power supply line, and a line connected with the negative terminal of the smoothing capacitor C4 becomes a GND line.

The error amplifier 3 is connected between the power supply line and the GND line. The error amplifier 3 is configured to control the current flowing through the light emitting diode PC2 of the photo-coupler in accordance with a difference between the output voltage Vo and a reference voltage.

Thereby, a feedback (FB) signal corresponding to the output voltage Vo is transmitted from the light emitting diode PC2 to the light receiving transistor PC1 of the primary-side circuit, and is input to the FB terminal of the controller IC1, as a voltage signal $V_{FB}$.

The controller IC1 of the primary-side circuit is configured to control a duty ratio of an on time period and an off time period of the first switching element on the basis of the voltage signal $V_{FB}$ input to the FB terminal, thereby controlling an amount of the power to be fed to the secondary-side circuit.

A negative terminal of the capacitor C5 is connected to a connection point a of the N-type transistor Tr and the other end of the secondary winding T3. A positive terminal of the capacitor C5 is connected to a plus input terminal of the comparator 1, an output terminal of the charging circuit 2 and the Vcc terminal of the controller IC2.

The charging circuit 2 is connected between the connection point b and the positive terminal of the capacitor C5, and is a circuit configured to charge the capacitor C5 by using a voltage of the smoothing capacitor C4.

Specifically, the charging circuit 2 is configured by a series circuit of a constant current circuit 21 connected to the positive terminal of the capacitor C5, a second switching element 22 serially connected to the constant current circuit 21, and a diode 23 of which a cathode is connected to the second switching element 22. An anode of the diode 23 is connected to the connection point b.

As the second switching element 22, a transistor such as a MOSFET is used.

The comparator 1 is configured to output a high-level signal of turning on the second switching element 22 at a state where a voltage of the capacitor C5 is less than a predetermined first value (for example, 14V), thereby permitting the charging of the capacitor C5 by the charging circuit 2. The first value may be a value capable of driving the gate of the N-type transistor Tr.

Also, the comparator 1 outputs a low-level signal of turning off the second switching element 22 when a voltage of the capacitor C5 reaches a predetermined second value (for example, 24V) during an on time period of the second switching element 22, thereby prohibiting the charging of the capacitor C5 by the charging circuit 2. The second value may be a value at which an element is not destroyed, with considering a withstanding voltage of the element.

The comparator 1 is configured so that the positive terminal of the capacitor C5 is connected to the plus input terminal and a voltage having one of the first and second values is input to the minus input terminal.

The controller IC2 is operated by using the voltage of the capacitor C5 which is supplied from the Vcc terminal, as the power supply voltage, and outputs a control signal from the Dry terminal to perform the on-and-off control of the N-type transistor Tr in synchronization with a predetermined timing.

Operations of the switching power-supply device configured as described above are described.

Before a synchronous rectification operation by the N-type transistor Tr of the secondary-side circuit starts after the primary-side circuit of the switching power-supply device operates, there is a time period in which the rectification is performed by the body diode D2 of the N-type transistor Tr. According to the rectification operation of the body diode D2, the smoothing capacitor C4 is charged. Also, since the voltage of the capacitor C5 is less than the first value upon the start of the switching power-supply device, the output of the comparator 1 is the high level, and the second switching element 22 is turned on, so that the capacitor C5 can be charged. When the on-and-off control of the first switching element starts, the output voltage Vo is output from the secondary-side circuit by the synchronous rectification operation.

Figure 2:
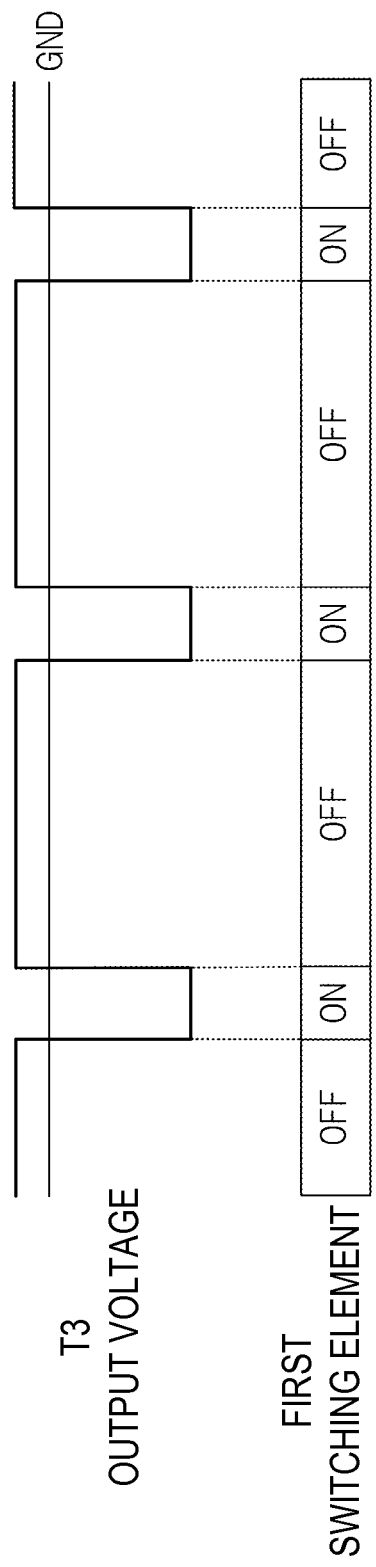
FIG. 2 illustrates a change in a voltage at the other end on the basis of one end of a secondary winding T3 of the switching power-supply device shown in FIG. 1.

FIG. 2 illustrates a change in the voltage at the other end on the basis of the one end of the secondary winding T3 of the switching power-supply device shown in FIG. 1. When the first switching element is off, the output voltage of the secondary winding T3 is a positive value greater than the ground. On the other hand, when the first switching element is on, the output voltage of the secondary winding T3 is a negative value less than the ground.

Therefore, when the first switching element is on, the current flows from the smoothing capacitor C4 to the charging circuit 2, and the capacitor C5 is charged by the charging circuit 2. By the voltage of the capacitor C5, the controller IC2 drives the gate of the N-type transistor Tr, and the N-type transistor Tr performs the synchronous rectification.

When the charging of the capacitor C5 starts and the voltage of the capacitor C5 reaches the second value, the second switching element 22 becomes off and the charging of the capacitor C5 is stopped. When the voltage of the capacitor C5 becomes less than the first value, the second switching element becomes on and the state is shifted to the state where the capacitor C5 can be charged. At this state, when the first switching element becomes on, the charging of the capacitor C5 starts.

According to the switching power-supply device shown in FIG. 1, the rectification by the synchronous rectification method can be performed without adding the auxiliary winding to the secondary winding of the transformer T. Accordingly, it is possible to save the manufacturing cost of the switching power-supply device. Also, the auxiliary winding is not used, so that a winding short due to a component failure does not occur. Therefore, it is possible to improve the safety.

The output voltage of the secondary winding T3 becomes a very large negative value during the on time period of the first switching element. According to the switching power-supply device shown in FIG. 1, the comparator 1 controls the charging by the charging circuit 2 so that the capacitor C5 is not charged beyond necessity. Accordingly, it is possible to secure the endurance of the series circuit of the charging circuit 2 and the capacitor C5 connected in parallel with the N-type transistor Tr.

Figure 3:
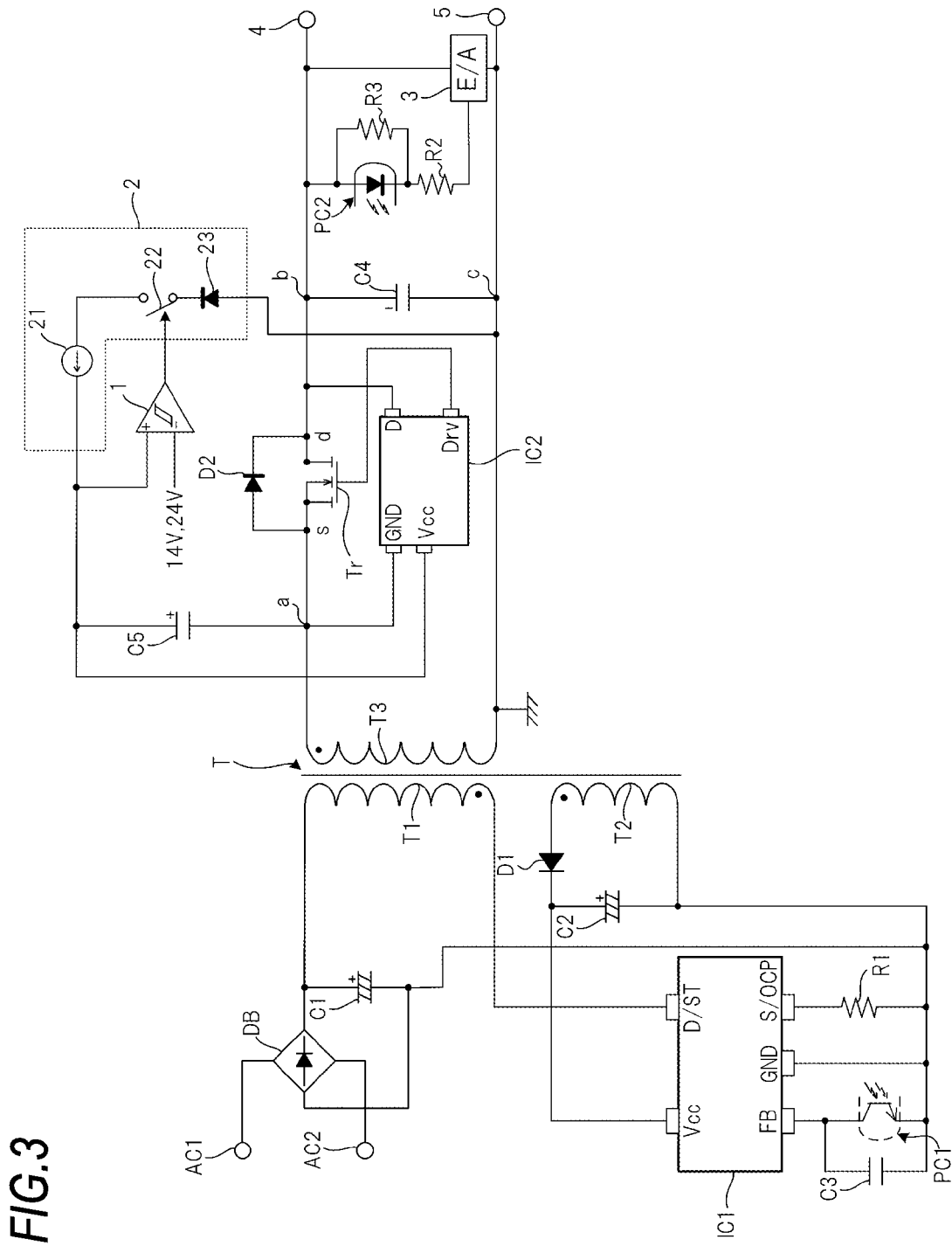
FIG. 3 shows a first modified embodiment of the switching power-supply device shown in FIG. 1.

FIG. 3 shows a first modified embodiment of the switching power-supply device shown in FIG. 1. The switching power-supply device shown in FIG. 3 has the same configuration as the switching power-supply device shown in FIG. 1, except that the anode of the diode 23 configuring the charging circuit 2 of the secondary-side circuit is connected to the ground-side output terminal 5, not the connection point b.

The operations of the switching power-supply device shown in FIG. 3 are basically the same as the switching power-supply device shown in FIG. 1, and the capacitor C5 can be charged by the charging circuit 2 during the on time period of the first switching element.

Figure 4:
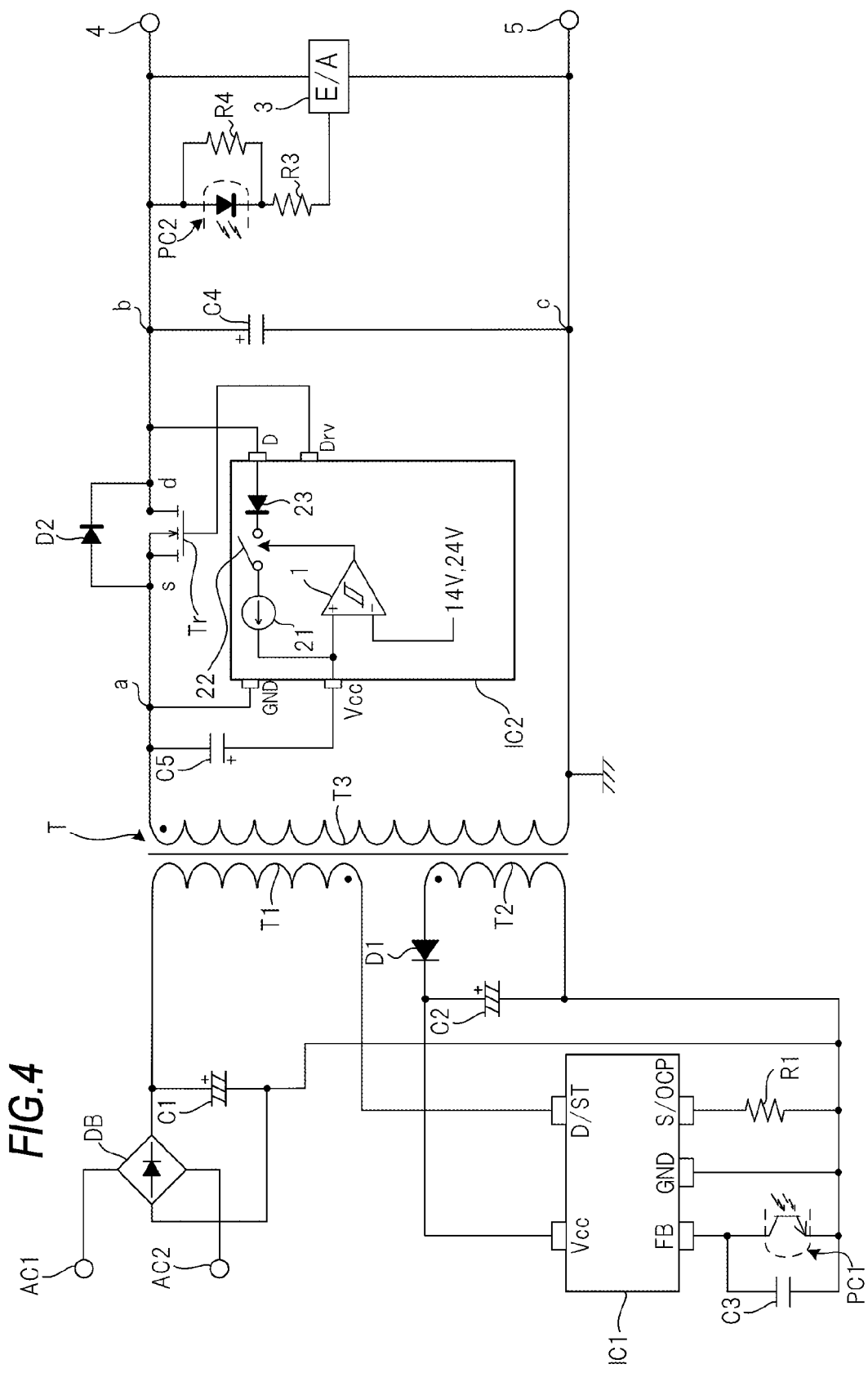
FIG. 4 shows a second modified embodiment of the switching power-supply device shown in FIG. 1.

FIG. 4 shows a second modified embodiment of the switching power-supply device shown in FIG. 1. The switching power-supply device shown in FIG. 4 has the same configuration as the switching power-supply device shown in FIG. 1, except that the comparator 1 and the charging circuit 2 are embedded in the controller IC2.

The controller IC2 of the switching power-supply device shown in FIG. 4 has the comparator 1, the constant current circuit 21, the second switching element 22, and the diode 23, which are embedded in the controller IC2.

The plus input terminal of the comparator 1 is connected with the Vcc terminal and is supplied with the power supply voltage from the capacitor C5. The anode of the diode 23 is connected to the drain terminal of the controller IC2. The output terminal of the constant current circuit 21 is connected to a connection point of the Vcc terminal and the plus input terminal of the comparator 1.

The operations of the switching power-supply device shown in FIG. 4 are basically the same as the switching power-supply device shown in FIG. 1, and the capacitor C5 can be charged by the charging circuit having the diode 23, the second switching element 22 and the constant current circuit 21 on the basis of the voltage of the smoothing capacitor C4 during the on time period of the first switching element.

Figure 5:
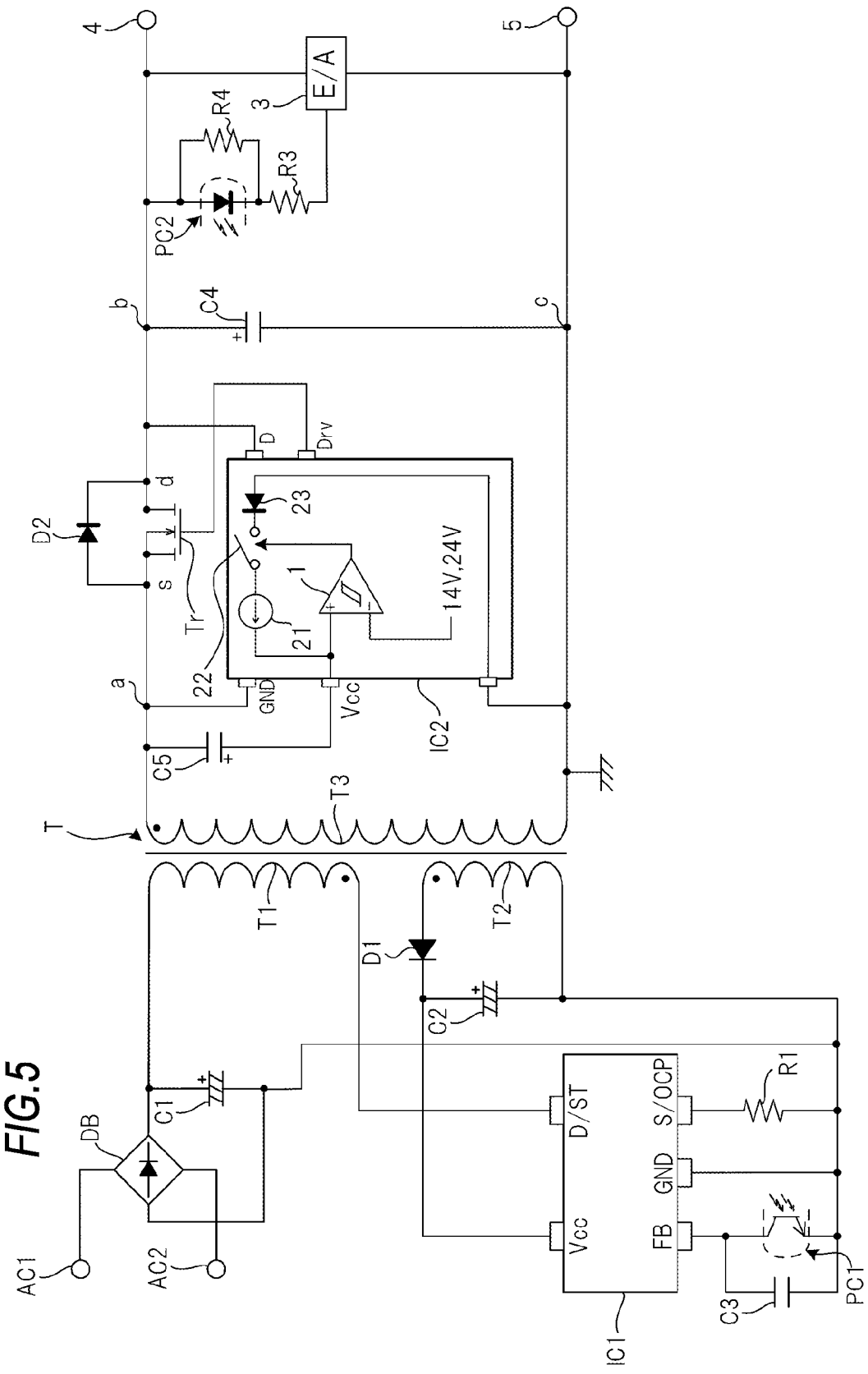
FIG. 5 shows a third modified embodiment of the switching power-supply device shown in FIG. 1.

FIG. 5 shows a third modified embodiment of the switching power-supply device shown in FIG. 1. The switching power-supply device shown in FIG. 5 has the same configuration as the switching power-supply device shown in FIG. 4, except that the anode of the diode 23 embedded in the controller IC2 is connected to the ground line (the ground-side output terminal 5).

The operations of the switching power-supply device shown in FIG. 5 are basically the same as the switching power-supply device shown in FIG. 3, and the capacitor C5 can be charged by the charging circuit having the diode 23, the second switching element 22 and the constant current circuit 21 on the basis of the voltage of the smoothing capacitor C4 during the on time period of the first switching element.

According to the switching power-supply device shown in FIGS. 4 and 5, since the comparator 1 and the charging circuit 2 can be integrated, it is possible to prevent an area of the switching power-supply device from being increased.

Although the disclosure has been described with reference to the illustrative embodiments, the illustrative embodiments are just exemplary and can be changed without departing from the gist of the disclosure.

As described above, the specification discloses followings.

A disclosed integrated circuit is an integrated circuit to be used in a switching power-supply device having: a first switching element; a transformer including a primary winding connected to the first switching element and a secondary winding magnetically coupled to the primary winding; a first control circuit configured to perform on-and-off control of the first switching element; a smoothing capacitor connected between a ground-side output terminal connected to one end of the secondary winding and a non-ground-side output terminal connected to the other end of the secondary winding; an N-type transistor for rectification connected between the non-ground-side output terminal and the other end of the secondary winding, and a capacitor connected to a connection point of the N-type transistor and the other end of the secondary winding, the integrated circuit comprising: a charging circuit, which is connected between a connection point of the N-type transistor and the non-ground-side output terminal and the capacitor or between the capacitor and the ground-side output terminal and which charges the capacitor, and a second control circuit, which performs the on-and-off control of the N-type transistor by using a voltage of the capacitor as a power supply voltage.

The disclosed integrated circuit further has a charging control circuit configured to control the charging circuit on the basis of the voltage of the capacitor.

In the disclosed integrated circuit, the charging control circuit permits the charging of the capacitor by the charging circuit when the voltage of the capacitor is less than a predetermined first value.

In the disclosed integrated circuit, the charging control circuit prohibits the charging of the capacitor by the charging circuit when the voltage of the capacitor reaches a predetermined second value at a state where the charging by the charging circuit is permitted.

In the disclosed integrated circuit, the charging circuit is configured by a series circuit of a constant current circuit connected to the capacitor and a second switching element connected to the constant current circuit, and the charging control circuit is configured to prohibit the charging of the capacitor by the charging circuit by turning off the second switching element and to permit the charging of the capacitor by the charging circuit by turning on the second switching element.

In the disclosed integrated circuit, the charging circuit further has a diode of which an anode is connected to the second switching element of the series circuit.

In the disclosed integrated circuit, the charging circuit becomes a state where the capacitor can be charged, during an on time period of the first switching element.

In the disclosed integrated circuit, the charging circuit and the charging control circuit are embedded in the second control circuit.

A disclosed switching power-supply device has the integrated circuit, the first switching element, the transformer, the first control circuit, the smoothing capacitor, the capacitor, and the N-type transistor.

The invention claimed is:

1. A switching power-supply device that performs switching operation to control an output voltage, comprising:
   a first switching element;
   a transformer including a primary winding connected to the first switching element and a secondary winding magnetically coupled to the primary winding;
   a first control circuit configured to perform on-and-off control of the first switching element;
   a smoothing capacitor connected between a ground-side output terminal and a non-ground-side output terminal, where the ground-side output terminal is connected to one end of the secondary winding of the transformer and where the non-ground-side output terminal is connected to an other end of the secondary winding, of the switching power-supply device;
   an N-type transistor for rectification connected between the non-ground-side output terminal and the other end of the secondary winding; and
   a capacitor connected to a connection point of the N-type transistor and the other end of the secondary winding,
   an integrated circuit including:
     a charging circuit configured to charge the capacitor by using a voltage of the smoothing capacitor, the charging circuit connected between the capacitor and one of a connection point common to the N-type transistor and the non-ground-side output terminal or the ground-side output terminal;
     a second control circuit, which performs the on-and-off control of the N-type transistor by using a voltage of the capacitor as a power supply voltage; and
     a charging control circuit configured to control the charging circuit based on the voltage of the capacitor,
   wherein the charging circuit includes a diode, a second switching element, and a constant current circuit, where a first end of the diode is connected to the connection point or the ground-side output terminal and another end of the diode is connected to a first end of the second switching element, and the constant current circuit is connected between a second end of the second switching element and the capacitor,
   wherein the charging control circuit turns on the second switching element when the voltage of the capacitor is less than a first predetermined value and turns off the second switching element when the voltage of the capacitor reaches a second predetermined value, and
   wherein the charging circuit charges the capacitor during an on time period of the first switching element.

2. The switching power-supply device according to claim 1,
   wherein the charging circuit and the charging control circuit are embedded in the second control circuit.

3. A switching power-supply device that performs switching operation to control an output voltage, comprising:

a first switching element;

a transformer including a primary winding connected to the first switching element and a secondary winding magnetically coupled to the primary winding;

a first control circuit configured to perform on-and-off control of the first switching element;

a smoothing capacitor connected between a ground-side output terminal, which is connected to one end of the secondary winding, of switching power-supply device and a non-ground-side output terminal, which is connected to an other end of the secondary winding, of the switching power-supply device;

an N-type transistor for rectification connected between the non-ground-side output terminal and the other end of the secondary winding, and a capacitor connected to a connection point of the N-type transistor and the other end of the secondary winding, an integrated circuit including:

a charging circuit, which is connected between a connection point of the N-type transistor and the non-ground-side output terminal and the capacitor which charges the capacitor by using a voltage of the secondary winding;

a second control circuit, which performs the on-and-off control of the N-type transistor by using a voltage of the capacitor as a power supply voltage; and a charging control circuit configured to control the charging circuit based on the voltage of the capacitor, wherein the charging circuit includes a diode, a second switching element, and a constant current circuit, where a first end of the diode is connected to the connection point or the ground-side output terminal and another end of the diode is connected to a first end of the second switching element, and the constant current circuit is connected between a second end of the second switching element and the capacitor, wherein a cathode of the diode is connected with the second switching element, and an anode of the diode is connected with the ground-side output terminal, wherein the charging control circuit turns on the second switching element when the voltage of the capacitor is less than a first predetermined value and turns off the second switching element when the voltage of the capacitor reaches a second predetermined value, wherein the charging circuit charges the capacitor during an on time period of the first switching element.

\* \* \* \* \*